(12) United States Patent
Balijepalli et al.

(10) Patent No.: US 9,340,686 B2
(45) Date of Patent: May 17, 2016

(54) FORMULATION WITH DEFOAMER

(71) Applicants: Dow Global Technologies LLC, Midland, MI (US); Rohm and Haas Company, Philadelphia, PA (US)

(72) Inventors: Sudhakar Balijepalli, Midland, MI (US); Melinda H. Keefe, Willow Grove, PA (US); Laurel A. Rufe, Schwenksville, PA (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 293 days.

(21) Appl. No.: 14/063,581

(22) Filed: Oct. 25, 2013

(65) Prior Publication Data

US 2014/0121310 A1    May 1, 2014

Related U.S. Application Data

(60) Provisional application No. 61/719,627, filed on Oct. 29, 2012.

(51) Int. Cl.
    *C08K 5/24*      (2006.01)
    *C09D 7/12*      (2006.01)
    *C09D 133/04*      (2006.01)

(52) U.S. Cl.
    CPC ............. *C09D 7/1233* (2013.01); *C09D 7/125* (2013.01); *C09D 133/04* (2013.01); *C08L 2201/54* (2013.01)

(58) Field of Classification Search
    CPC ........ C09D 5/00; C09D 7/125; C09D 133/10; C09D 133/08; C08L 83/06
    See application file for complete search history.

(56) References Cited

U.S. PATENT DOCUMENTS

| | | | |
|---|---|---|---|
| 6,756,459 B2 * | 6/2004 | Larson | ................... C08F 257/02 524/547 |
| 7,294,653 B2 | 11/2007 | Zeng | |
| 2004/0022951 A1 | 2/2004 | Maurus | |
| 2004/0062873 A1 | 4/2004 | Jung et al. | |
| 2004/0122113 A1 * | 6/2004 | Zeng | ................... B01D 19/0413 516/124 |
| 2005/0261407 A1 | 11/2005 | Khan et al. | |
| 2012/0269747 A1 | 10/2012 | Iimura et al. | |

FOREIGN PATENT DOCUMENTS

| | | |
|---|---|---|
| DE | 10146446 A1 | 2/2003 |
| WO | 2002074407 A2 | 9/2002 |
| WO | 2007137948 A1 | 12/2007 |
| WO | 2011127315 A2 | 10/2011 |

\* cited by examiner

*Primary Examiner* — Wenwen Cai
(74) *Attorney, Agent, or Firm* — Reid S. Willis

(57) ABSTRACT

The present invention relates to a composition comprising an aqueous dispersion of a binder and from 0.01 to 2 weight percent, based on the weight of the binder, of a defoamer characterized by the following structure:

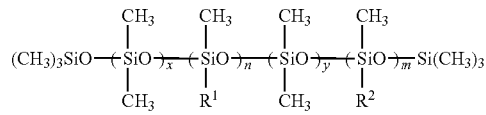

wherein $R^1$, $R^2$, x, y, m, and n are defined herein. The composition of the present invention is especially useful in reducing foam formation in a low VOC paint formulation.

10 Claims, No Drawings

FORMULATION WITH DEFOAMER

BACKGROUND OF THE INVENTION

The present invention relates to a composition containing a defoamer, more particularly, a particular class of paint formulation that contains a specific class of defoamers.

As regulatory pressures have increased the demand for introducing low VOC paints into the marketplace, challenges arising from these low VOC paints become more apparent. For example, excess foaming arises, in part, from the removal of high VOC coalescents and the increased use of low VOC surfactants, which promote the formation of a stabilized foam. Moreover, in the absence of coalescents and solvents, paint making processes involve mixing together materials that promote entrainment of air, which is another source of undesirable levels of stable foam formation.

Foaming problems are not unique to low VOC paints; for example, binders with repeat units of a phosphorous acid monomer such a phosphoethyl methacrylate are prone to excess formation of foam, presumably due to increased foam stabilization caused by the higher charge density carried by the binder.

Accordingly, it would be desirable to find a defoamer that is capable of destabilizing foam across a variety of binder systems.

SUMMARY OF THE INVENTION

The present invention addresses a need by providing a composition comprising an aqueous dispersion of a binder and from 0.01 to 2 weight percent, based on the weight of the binder, of a defoamer characterized by the following structure:

$$(CH_3)_3SiO-(SiO)_x-(SiO)_n-(SiO)_y-(SiO)_m-Si(CH_3)_3$$

with methyl groups on the first, third positions and $R^1$, $R^2$ substituents.

wherein $R^1$ is $-(CH_2)_3O(C_3H_6O)_pCH_3$;

$R^2$ is $-(CH_2)_3O(C_2H_4O)_qCH_3$;

x is from 0 to 240;

y is from 0 to 240;

m+n=10 to 30;

x+y+m+n=150 to 250;

p is 15 to 25; and q is 10 to 40;

wherein the binder has a $T_g$ of less than 20° C., or the binder contains structural units of a phosphorus acid monomer, or both.

The present invention addresses a need in the art by providing a composition that does not suffer from excess foam formation.

DETAILED DESCRIPTION OF THE INVENTION

The present invention is a composition comprising an aqueous dispersion of a binder and from 0.01 to 2 weight percent, based on the weight of the binder, of a defoamer characterized by the following structure:

$$(CH_3)_3SiO-(SiO)_x-(SiO)_n-(SiO)_y-(SiO)_m-Si(CH_3)_3$$

wherein $R^1$ is $-(CH_2)_3O(C_3H_6O)_pCH_3$;

$R^2$ is $-(CH_2)_3O(C_2H_4O)_qCH_3$;

x is from 0 to 240;

y is from 0 to 240;

m+n=10 to 30;

x+y+m+n=150 to 250;

p is 5 to 40; and q is 5 to 50;

wherein the binder has a $T_g$ of less than 20° C., or the binder contains structural units of a phosphorus acid monomer, or both.

Preferably, x30 y+m+n=175 to 225; preferably m+n=15 to 5; preferably p=10 to 40, more preferably 15 to 25; and preferably q =30 to 40. Preferably, the concentration of the defoamer is from 0.05 to 1 weight percent, based on the weight of the binder.

The binder is a stable aqueous dispersion of polymer particles having a $T_g$ preferably in the range of from −60° C. to 60° C., more preferably to 20° C., and most preferably to 15° C., and can be any binder suitable for coatings compositions, including aqueous dispersions of acrylic, styrene-acrylic, vinyl ester-acrylic, vinyl ester-ethylene, silicone, urethane, vinylidene halide, and vinyl halide polymer particles.

The binders may include structural units of a phosphorus acid monomer, preferably in the range of 0.2 to 4 weight percent, based on the weight of the binder. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate and phosphopropyl methacrylates, with phosphoethyl methacrylate being especially preferred. "Phosphoethyl methacrylate" (PEM) is used herein to refer to the following structure:

where R is H or

As used herein, the term "structural unit" refers to a remnant of the named monomer. A structural unit of PEM is as follows:

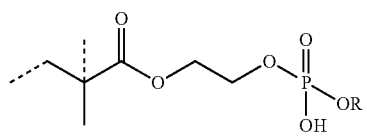

where the dashed lines represent the point of attachment to the polymer backbone. Examples of commercially available PEM-containing binders include EVOQUE™ 2350 Pre-Composite Polymer (A Trademark of The Dow Chemical Company or Its Affiliates), and EVOQUE™ 1140 Pre-Composite Polymer.

The composition of the present invention is useful in low VOC paint formulations or paint formulations comprising binders containing structural units of a phosphorus acid monomer or both. The amount of binder in the paint composition depends upon the degree of gloss required. For example, for high gloss trim paints, the weight percent binder is typically in the range of 30 to 40 weight percent, based on the weight of the formulation; for the semi-gloss, the weight percent of binder is typically 15 to 25 weight percent, based on the weight of the formulation; for satin and flat paints, the range is typically form 5 to 10 weight percent, based on the weight of the formulation.

The composition of the present invention may include additional materials such as pigments such as unencapsulated or partially or completely encapsulated $TiO_2$; fillers; surfactants; dispersants; thickeners; colorants; preservatives; flow agents; leveling agents; extenders, including opaque polymers; and neutralizers. Although it is also possible to include solvents and coalescents, these materials would be minimized for low VOC formulations, that is, formulations with not more than 50 g/L.

EXAMPLES

The following examples are for illustrative purposes only and are not intended to limit the scope of the invention.

In the following examples, Binder 1 refers to EVOQUE™ 1140 Pre-Composite Polymer (low VOC, $T_g$=3-5° C.); and binder 2 refers to RHOPLEX™ VSR1050 Acrylic Emulsion (low VOC, $T_g$=5-10° C.). DF1 refers to DC71 defoamer, which is the defoamer used in the compositions of the examples of the present invention. DC71 is characterized as follows:

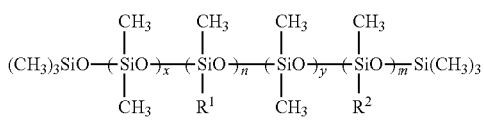

where $R^1$ is —$(CH_2)_3O(C_3H_6O)_pCH_3$; and $R^2$ is —$(CH_2)_3O(C_2H_4O)_qCH_3$; and p is 19 to 21; q is 33 to 35; n+m is 18 to 20; x+y+n+m is 195 to 205.

DF2, DF3, and DF4 are defoamers used in the comparative examples. DF2 refers to Dow Corning Additive DC74 Defoamer; DF3 is Byk 022 Defoamer; and DF4 is DrewPlus L475 Defoamer. DC74 is a polysiloxane polyether defoamer with pendant block copolymers of ethylene oxide and propylene oxide groups; these groups are primarily terminated with OH groups and none are terminated with methyl groups. Byk 022 is a polysiloxane polyether defoamer with pendant ethylene oxide groups and pendant propylene oxide groups; these groups are primarily terminated with OH groups and none are terminated with methyl groups. DrewPlus L475 is a nonsilicon defoamer containing hydrophobic polymers in mineral oil.

Table 1 represents the formulation for Paint 1, which is a low VOC paint with a VOC concentration of 33 g/L.

TABLE 1

| Paint 1 Formulation | | |
|---|---|---|
| Paint 1 Material Name | Pounds | Gallons |
| Grind | | |
| Binder 1 | 242.3 | 27.5 |
| Water | 71.8 | 8.6 |
| Ammonia (28% aq.) | 1.0 | 0.1 |
| Kronos 4311 $TiO_2$ | 238.1 | 12.2 |
| Water | 25.0 | 3.0 |
| TAMOL ™ 1124 Dispersant | 3.3 | 0.3 |
| TERGITOL ™ 15-S-9 Surfactant | 2.0 | 0.3 |
| Minex 10 Filler | 39.2 | 1.8 |
| LetDown | | |
| Binder 2 | 223.4 | 25.5 |
| ROPAQUE ™ Ultra Opaque Polymer | 75.2 | 8.8 |
| Texanol Coalescent | 9.9 | 1.2 |
| ACRYSOL ™ RM-2020 NPR Rheology Modifier | 17.0 | 2.0 |
| ACRYSOL ™ RM-8W Rheology Modifier | 3.0 | 0.3 |
| Water | 69.4 | 8.3 |
| Totals | 1020.5 | 100 |
| Property | Value | |
| Total PVC | 33.0 | % |
| Volume Solids | 36.0 | % |
| Weight Solids | 45.9 | % |
| VOC Generic Water Excl. | 33.1 | g/L |

Table 2 represents the formulation for Paint 2, which is a low VOC paint with a VOC concentration of 33 g/L.

| Paint 2 Material Name | Pounds | Gallons |
|---|---|---|
| Grind | | |
| Ammonia (28% aq.) | 1.0 | 0.1 |
| Kronos 4311 $TiO_2$ | 238.1 | 12.2 |
| Water | 25.0 | 3.0 |
| TAMOL ™ 1124 Dispersant | 3.3 | 0.3 |
| TERGITOL ™ 15-S-9 Surfactant | 2.0 | 0.3 |
| Minex 10 Filler | 39.2 | 1.8 |
| LetDown | | |
| Binder 2 | 443.7 | 50.7 |
| ROPAQUE ™ Ultra Opaque Polymer | 75.2 | 8.8 |
| Texanol Coalescent | 9.8 | 1.2 |
| ACRYSOL ™ RM-2020 NPR Rheology Modifier | 25.5 | 2.9 |
| ACRYSOL ™ RM-8W Rheology Modifier | 4.5 | 0.5 |
| Water | 151.1 | 18.1 |
| Totals | 1018.4 | 100.0 |
| Property | Value | |
| Total PVC | 33.00 | % |
| Volume Solids | 36.00 | % |
| Weight Solids | 45.74 | % |
| VOC Generic Water Excl. | 33 | g/L |

Procedure 1: Defoaming Test for Latex Formulations

A known volume (0.5-2 mL) of binder 1 and binder 2 were separately mixed with a defoamer in vials with TiteSeal closures, commonly known as PPR vials, (parallel pressure reactor vials). The defoamer concentrations in the binders are noted in Table 3. The vials containing the formulations were allowed to sit overnight. The vials were then shaken with a mechanical "wrist shaker" for 3 min at a frequency of 2-5 shakes/s. The shear generated caused entrainment of a known volume of air in the formulation in the form of micro/macro bubbles. The formulation was then put out on to a Mylar film and drawn down to wet thickness of 12 mils. The drawn coating was then placed under the microscope and time-lapse image acquisition was initiated to measure the degree of incorporation of bubbles in the coating. Results for the number of micro/macro bubbles (micro bubbles defined as any bubble with a diameter <70 microns and macro bubbles defined as any bubble with a diameter of >70 microns) are shown in Table 3. Based on the number of micro and macro bubbles a threshold is defined, above which the defoamer is considered to pass or fail, as noted in results in Table 3.

Procedure 2: Defoaming Test of Latex-TiO$_2$ Formulations

Samples were prepared by loading binder (225 g) and a known concentration of defoamer (active defoamer on wet binder) to a 500-mL plastic container. The container was placed on a horizontal bench top shaker for 30 min at 180 shakes/min. The density of the mixture was measured and recorded using a density cup after removal from the shaker. A portion of the agitated mixture was then used to prepare binder/TiO$_2$ composite samples.

Samples were prepared by loading the binder plus defoamer pre-agitated mixture (201 g) to a 1-quart metal can followed by the addition of water (60.59 g). The mixture was then placed on an overhead mixer with a marine propeller blade; TiO$_2$ slurry (193 g) was then added to this mixture which was stirred at 450 rpm. The full composite mixture was stirred for an additional 15 min after the slurry addition was complete. The density of the final mixture was measured using a density cup. The ratio of the final density to the theoretically calculated density was used to evaluate the performance of the different defoamers. The results are reported in Table 4.

Procedure 3: Defoaming of Paint Formulations

Binder and defoamer were mixed as described in Procedure 1. The defoamer concentrations in the binders are noted in Table 5. The vials containing the formulations were allowed to stand overnight. Zirconox ceramic beads (0.5 g, 1.0-1.2 mm) were added to the vial to increase shear on the coating material. The vials were then shaken for 3 min at a frequency of 2-5 shakes/s with a mechanical wrist shaker for the defoaming test. The shear generated caused entrainment of a known volume of air in the formulation in the form of micro/macro bubbles. The formulation was then put out on to a Mylar film and drawn down to wet thickness of 12 mils. The drawn coating was then placed under the microscope and time-lapse image acquisition was initiated to measure the degree of incorporation of bubbles in the coating. Results for the number of micro/macro bubbles (micro bubbles defined as any bubble with a diameter <70 microns and macro bubbles defined as any bubble with a diameter of >70 microns) are shown in Table 3. Based on the number of micro and macro bubbles a threshold is defined, above which the defoamer is considered to pass or fail, as noted in results in Table 5.

TABLE 3

Foaming Results for Procedure 1
Results for Procedure 1

| Binder/Defoamer | Defoamer % Conc. | # of Macro bubbles* | # of Micro Bubbles* | Pass/Fail |
|---|---|---|---|---|
| Binder 1 | | | | |
| DF-1 | 0.75 | 9 | 116 | Pass |
| DF-2 | 0.75 | 3 | 103 | Pass |
| DF-3 | 0.75 | 13 | 104 | Fail |
| DF-4 | 2.25 | 31 | 117 | Fail |
| Binder 2 | | | | |
| DF-1 | 0.75 | 0 | 178 | Pass |
| DF-2 | 0.75 | 10 | 39 | Fail |
| DF-3 | 0.75 | | | |
| DF-4 | 2.25 | 2 | 55 | Pass |

*# of bubbles after ~10 minutes of drawing down coating
Fail—≥10 Macro bubbles and/or ≥200 Micro bubbles As Table 4 shows, DF-1 is the only defoamer that passed in all the tested formulations

TABLE 4

Foaming Results for Procedure 2
Results for Procedure 2

| Binder/Defoamer | Defoamer Conc. (% of wet binder) | % of initial density | Pass/Fail |
|---|---|---|---|
| Binder 1 | | | |
| DF-1 | 0.1 | 92.7 | Pass |
| DF-2 | 0.1 | 86 | Fail |
| DF-3 | 0.1 | 70 | Fail |
| DF-4 | 0.10 | 65 | Fail |
| Binder 2 | | | |
| DF-1 | 0.1 | 97.2 | Pass |
| DF-2 | 0.1 | 76.9 | Fail |
| DF-3 | 0.1 | 98.6 | Pass |
| DF-4 | 0.10 | 68.5 | Fail |

Fail—≤90% of initial density

TABLE 5

Foaming Results for Procedure 3
Results for Procedure 3

| Paint/Defoamer | % Defoamer Conc. | Number of Macro bubbles* | Number of Micro Bubbles* | Pass/Fail |
|---|---|---|---|---|
| Paint 1 | | | | |
| DF-1 | 0.75 | 0 | 1 | Pass |
| DF-2 | 0.75 | 0 | 15 | Pass |
| DF-3 | 0.75 | 0 | 0 | Pass |
| DF-4 | 2.25 | 0 | 212 | Fail |
| Paint 2 | | | | |
| DF-1 | 0.75 | 0 | 2 | Pass |
| DF-2 | 0.75 | 0 | 2 | Pass |
| DF-3 | 0.75 | 0 | 1 | Pass |
| DF-4 | 2.25 | 0 | 0 | Pass |

*Number of bubbles after ~10 minutes of drawing down coating
Fail—≥10 Macro bubbles and/or ≥200 Micro bubbles Results indicate that for all three procedures, binder, binder+TiO$_2$ composite formation, and paint formulation studies, DF1 is universal in its ability to reduce the volume micro- and macrofoam.

The invention claimed is:

1. A composition comprising an aqueous dispersion of a binder and from 0.01 to 2 weight percent, based on the weight of the binder, of a defoamer characterized by the following structure:

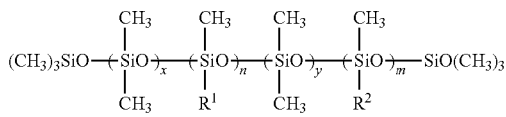

wherein $R^1$ is —$(CH_2)_3O(C_3H_6O)_{19-21}CH_3$;
$R^2$ is —$(CH_2)_3O(C_2H_4O)_{33-35}CH_3$;
x+y+m+n=175 to 225; and
m+n=15 to 25;
the binder is an acrylic, a styrene-acrylic, or a vinyl ester acrylic binder; and
the binder has a $T_g$ of less than 20° C., and/or the binder contains structural units of a phosphorus phosphorus acid monomer.

2. The composition of claim 1 wherein the binder has a $T_g$ of less than 15° C.

3. The composition of claim 2 wherein the binder comprises from 0.2 to 4 weight percent structural units of phosphoethyl methacrylate, based on the weight of the binder.

4. The composition of claim 1 which further comprises one or more materials selected from the group consisting of $TiO_2$, a neutralizing agent, a dispersant, a surfactant, a filler, a thickener, a coalescent, a preservative, a flow agent, a leveling agent, and a neutralizer.

5. The composition of claim 3 which further comprises $TiO_2$, a dispersant, a surfactant, a thickener, and a neutralizer.

6. The composition of claim 5 which has a VOC of not more than 50 g/L.

7. A composition comprising an aqueous dispersion of a binder and from 0.01 to 2 weight percent, based on the weight of the binder, of a defoamer characterized by the following structure:

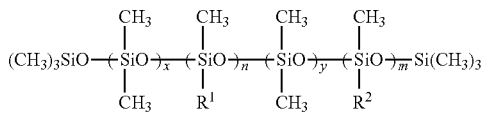

wherein $R^1$ is —$(CH_2)_3O(C_3H_6O)_{19-21}CH_3$;
$R^2$ is —$(CH_2)_3O(C_2H_4O)_{33-35}CH_3$;
x+y+m+n=175 to 225; and
m+n=15 to 25;
the binder is an acrylic, a styrene-acrylic, or a vinyl ester acrylic binder; and
the binder has a $T_g$ of less than 15° C.

8. The composition of claim 7 which further comprises one or more materials selected from the group consisting of $TiO_2$, a neutralizing agent, a dispersant, a surfactant, a filler, a thickener, a coalescent, a preservative, a flow agent, a leveling agent, and a neutralizer.

9. The composition of claim 7 which further comprises $TiO_2$, a dispersant, a surfactant, a thickener, and a neutralizer.

10. The composition of claim 9 which has a VOC of not more than 50 g/L.

* * * * *